United States Patent [19]
Cokeh

[11] Patent Number: 5,143,407
[45] Date of Patent: Sep. 1, 1992

[54] PIPE COUPLING WITH COPPER SLEEVE ENGAGING COPPER LINED PIPE

[76] Inventor: Emmet Cokeh, 17101 Hiawatha St., Granada Hills, Calif. 91344

[21] Appl. No.: 660,421

[22] Filed: Feb. 25, 1991

[51] Int. Cl.$^5$ .............................................. F16L 13/10
[52] U.S. Cl. .................................... 285/55; 285/331; 285/398; 285/915
[58] Field of Search ................. 285/398, 331, 55, 915, 285/397

[56] References Cited

U.S. PATENT DOCUMENTS

| | | | |
|---|---|---|---|
| 89,373 | 4/1869 | Abbott | 285/398 |
| 2,470,359 | 5/1949 | McLean | 285/398 |
| 3,188,117 | 6/1965 | Press et al. | 285/398 |
| 3,433,505 | 3/1969 | Weatherhead, III | 285/398 |
| 3,777,354 | 12/1973 | Masters | 285/398 |
| 3,796,057 | 3/1974 | Dougherty | 285/298 |
| 4,269,437 | 5/1981 | Shaw et al. | 285/398 |
| 4,274,665 | 6/1981 | Marsh, Jr. | 285/398 |

FOREIGN PATENT DOCUMENTS

| | | | |
|---|---|---|---|
| 215402 | 1/1957 | Australia | 285/398 |
| 661319 | 6/1938 | Fed. Rep. of Germany | 285/398 |
| 1571744 | 6/1969 | France | 285/355 |
| 281445 | 12/1927 | United Kingdom | 285/398 |

Primary Examiner—Eric K. Nicholson
Attorney, Agent, or Firm—Robert M. Sperry

[57] ABSTRACT

An improved pipe coupling device comprising a cylindrical outer layer of plastic, such as polyvinyl chloride formed with a central inwardly-extending boss which coaxially supports a copper pipe extending therethrough and having recesses encircling said copper pipe adajcent each end of said outer layer to permit pipe to be coupled to be inserted into said recesses in a manner to encircle said copper pipe and to facilitate joining of the pipe to be coupled to said outer layer.

17 Claims, 2 Drawing Sheets

PIPE COUPLING WITH COPPER SLEEVE ENGAGING COPPER LINED PIPE

BACKGROUND

1. Field of Invention

This invention relates to improved pipe couplings and is especially directed to improved means for coupling multi-layer pipe and the like.

2. Prior Art

As is well known, pipes for transporting fluids may be formed of metals, such as lead or copper, or of plastic, such as polyvinyl chloride. Unfortunately, copper pipe is quite difficult to solder and is usually thin-walled and, therefore, can easily be deformed accidentally. Furthermore, copper pipes are extremely difficult to solder or weld. On the other hand, lead and plastic pipes are easy to work with and, hence, are very popular with do-it-yourself plumbers. However, lead and plastic pipes have been found to sometimes release carcinogenic materials and, thus, are unsuitable for carrying domestic water and their use is prohibited by law in many places. To overcome these problems, multi-layer pipe has been proposed, having an inner layer of copper to protect the water and having an outer layer of plastic which is strong enough to prevent deformation of the copper liner and which provides the ease of working for each the plastic pipe is known. However, most of these multi-layered pipes require complex and expensive coupling devices and, even where this is not so, extreme care must be exercised in making joints and couplings with such multi-layered pipe or else the plastic coating will be exposed to the water and may contaminate it.

A search in the United States Patent Office has revealed the following references:

| U.S. PAT. NO. | INVENTOR | ISSUED |
|---|---|---|
| 4,400,019 | B. E. Fruck | Aug. 23, 1983 |
| 4,556,240 | T. Yoshida | Dec. 3, 1985 |
| 4,709,946 | J. J. Hunter | Dec. 1, 1987 |
| 4,927,184 | P. Bourot et al | May 22, 1990 |

Each of these references is subject to the limitations set forth above. Thus, none of the prior art pipe coupling devices have been entirely satisfactory.

BRIEF SUMMARY AND OBJECTS OF INVENTION

The disadvantages of prior art pipe coupling devices are overcome with the present invention and an improved pipe coupling device is proposed which is simple and inexpensive to produce and which can be used quickly, easily and safely, even by amateur plumbers, to couple pipe formed of copper, plastic or multi-layer pipe.

The advantages of the present invention are preferably attained by providing an improved pipe coupling device comprising a cylindrical outer layer of plastic, such as polyvinyl chloride formed with a central inwardly-extending boss which coaxially supports a copper pipe extending therethrough and having recesses encircling said copper pipe adjacent each end of said outer layer to permit pipe to be coupled to be inserted into said recesses in a manner to encircle said copper pipe and to facilitate joining of the pipe to be coupled to said outer layer.

Accordingly, it is an object of the present invention to provide improved pipe coupling devices.

A further object of the present invention is to provide an improved pipe coupling device which is simple and inexpensive to produce, yet which can be used quickly, easily and safely, even by amateur plumbers for connecting domestic water pipes.

Another object of the present invention is to provide an improved pipe coupling device which can be used quickly, easily and safely, even by amateur plumbers to connect copper, plastic and multi-layer pipe.

A specific object of the present invention is to provide an improved pipe coupling device comprising a cylindrical outer layer of plastic, such as polyvinyl chloride formed with a central inwardly-extending boss which coaxially supports a copper pipe extending therethrough and having recesses encircling said copper pipe adjacent each end of said outer layer to permit pipe to be coupled to be inserted into said recesses in a manner to encircle said copper pipe and to facilitate joining of the pipe to be coupled to said outer layer.

These and other objects and features of the present invention will be apparent from the following detailed description, taken with reference to the figures of the accompanying drawings.

DETAILED DESCRIPTION OF THE INVENTION

Figure 1:
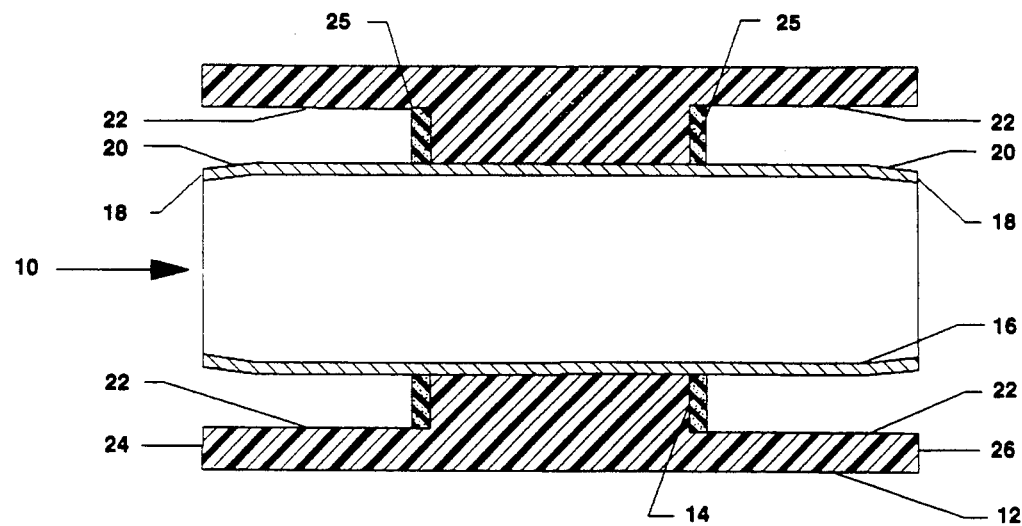
FIG. 1 is a vertical section through a pipe coupling device embodying the present invention.

In that form of the present invention chosen for purposes of illustration in the drawing, FIG. 1 shows a pipe coupling device, indicated generally at 10, having a generally cylindrical outer member 12 formed of a suitable material, such as polyvinyl chloride, formed with a central radially-inwardly projecting boss 14 which coaxially supports a length of copper pipe 16 extending through the sleeve 12. The ends 18 of the copper pipe 16 are beveled, as best seen in FIG. 1, to facilitate entry of the ends 18 of the copper pipe 16 into pipe sections to be joined thereto, as will be seen hereafter. As best seen in FIG. 1, annular recesses 22 are provided encircling each end 18 of the copper pipe 16 between the ends 24 and 26 of the cylindrical member 12 and the central boss 14. If desired, annular washers 25, formed of suitable material, such as rubber, may be inserted into the recesses 22 adjacent each end of the boss 14 to provide a seal against leakage.

Figure 2:
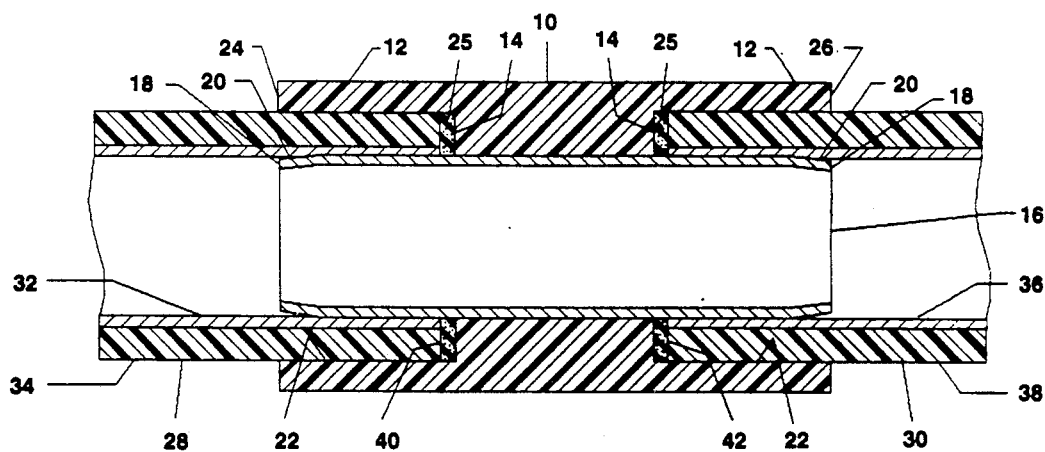
FIG. 2 is a vertical section showing the pipe coupling device of FIG. 1 used to join two sections of multi-layer pipe.

In use, FIG. 2 shows two sections of multi-layer pipe 28 and 30 joined to the pipe coupling device 10. As shown, multi-layer pipe 28 comprises a copper pipe 32 enclosed within an outer sheath 34 formed of a suitable plastic, such as polyvinyl chloride or the like. Similarly, multi-layer pipe 30 comprises a copper pipe 36 enclosed within an outer sheath 38 formed of a suitable plastic, such as polyvinyl chloride or the like. The end 40 of multi-layer pipe 28 is inserted into the recess 22 adjacent end 24 of cylindrical member 12 of the pipe coupling device 10 until it abuts the washer 25 and boss 14, while end 42 of multi-layer pipe 30 is inserted into the recess 22 adjacent end 26 of cylindrical member 12 until it abuts annular washer 25 and boss 14. The beveled portions 20 of the ends 18 of copper pipe 16 facilitate entry of the ends 18 into the adjacent ends of the copper pipes 32 and 36 of the multi-layer pipes 28 and 30. The ends 40 and 42 of the multi-layer pipes 28 and 30 are, preferably coated with a suitable adhesive, not shown, as is common in coupling plastic pipes, and are inserted into the recesses 22 to allow the adhesive to bond the plastic sheaths 34 and 38 to the plastic cylindrical member 12. Such a connection can, obviously, be made quickly and easily even by unskilled workmen. However, as this connection is made, the ends 18 of the copper pipe 16 of the pipe coupling device 10 will be inserted into the copper pipes 32 and 36 of the multi-layer pipes 28 and 30 and, hence, will preclude any contact by water flowing through the connection with the plastic sheaths 34 and 36 or with boss 14 or cylindrical member 12 of the pipe coupling device 10. Thus, quick and easy, yet completely safe, connections may be made, even by unskilled workmen using multi-layer pipe.

Figure 3:
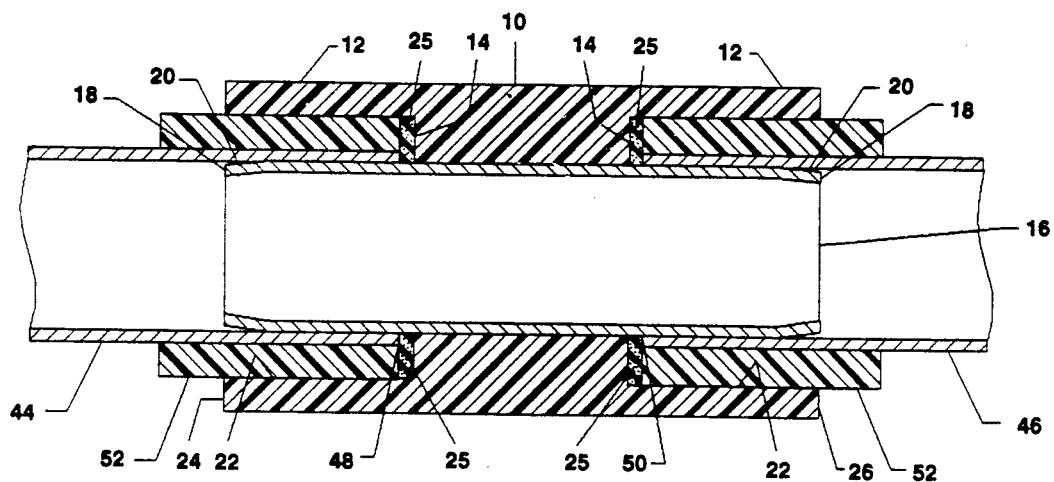
FIG. 3 is a vertical section showing the pipe coupling device of FIG. 1 used to join two sections of copper pipe.

FIG. 3 shows the pipe coupling device 10 used to join two sections of copper pipe, seen at 44 and 46. To facilitate making this connection, the ends 48 and 50, respectively, of the pipes 44 and 46 are provided with plastic sleeves 52 which serve to fill the recesses 22 between the pipes 44 and 46 and sleeve 12 of the pipe coupling device 10. The sleeves 52 may be secured to the ends 48 and 50 of the pipes 44 and 46 by shrinking or other conventional means and can be bonded to cylindrical member 12 of the pipe coupling device 10 by a conventional adhesive, not shown, as described above. As with the connection of FIG. 2, ends 18 of the copper pipe 16 of the pipe coupling device 10 are inserted into the ends 48 and 50 of the pipes 44 and 46 and, hence, preclude the plastic material of sleeves 52, boss 14 or cylindrical member 12 from coming in contact with water flowing through the connection. Thus, the pipe coupling device 10 permits copper pipe to be joined quickly, easily and safely, even by unskilled workers. If desired, resilient washers 25 may be inserted into the recesses 22 between the central boss 14 and the inner ends of the sleeves 52 and pipes 44 and 46.

Figure 4:
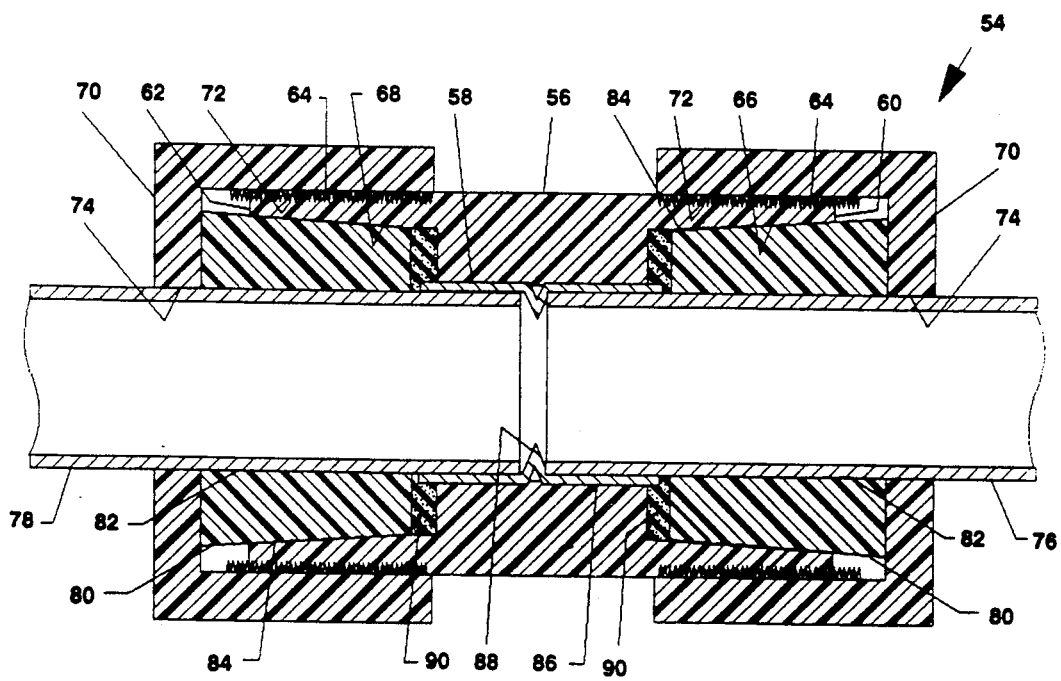
FIG. 4 is a vertical section showing an alternative form of the pipe coupling device of FIG. 3.

FIG. 4 shows an alternative form of the pipe coupling of FIG. 3. indicated generally at 54, having a generally cylindrical member 56 provided with an inwardly projecting central boss 58. The ends 60 and 62 of the cylindrical member 56 are externally threaded, as seen at 64, while the inner surfaces 66 and 68 of the cylindrical sleeve 56 are tapered inwardly from the ends 60 and 62 toward the central boss 58. Cup-shaped nuts 70 are internally threaded, as indicated at 72, to mate with the threads 64 on the ends 60 and 62 of the cylindrical member 56 and are each formed with a central opening 74 for receiving the pipes 76 and 78 to by coupled. Sleeves 80 are slideably positioned within each end 60 and 62 the cylindrical member 56 and are formed with cylindrical inner surfaces, as seen at 82, and have tapered outer surfaces 84. Also, a metal sleeve 86 is mounted within the boss 58 sized to encircle the pipes 76 and 78 and formed with a central recess 88 to assure proper positioning of the pipes 76 and 78. Finally, annular washers 90 are provided located between the boss 58 and the adjacent ends of the respective one of the sleeves 80. Obviously, if desired, suitable adhesive material, not shown, may be applied about the periphery of the pipes 76 and 78 as an additional guarantee against leakage and to further secure the pipes 76 and 78 to the coupling 54.

In using the pipe coupling 54, the ends of the pipes 76 and 78 are inserted into through the openings 74 of the cup-shaped nuts 70 and are passed through the sleeves 80 and washers 90 and are inserted into the metal sleeve 86 to abut the recess 88. Next, the nuts 70 are tightened which serves to drive the sleeves 80 toward the central boss 58 which causes the sleeves 80 to seal against the washers 90 to prevent leakage. At the same time, the tapered outer surfaces 84 of the sleeves 80 bear against the tapered inner surfaces 66 and 68 of the cylindrical member 56 and serve to wedge against the pipes 76 and 78 to securely lock the pipes 76 and 78 into the pipe coupling 54.

Obviously, numerous variations and modifications can be made without departing from the spirit of the present invention. Therefore, it should be clearly understood that the form of the present invention described above and shown in the figures of the accompanying drawings is illustrative only and is not intended to limit the scope of the present invention.

What is claimed is:

1. A pipe coupling comprising:
a pair of sections of copper-lined pipe to be connected; and
a pipe coupling device comprising a cylindrical member formed of plastic with a central inwardly-extending boss,
a copper pipe, dimensioned to frictionally engage the copper lining of said sections of pipe to be connected, extending coaxially through said sleeve and supported by said boss, and
a pair of annular recesses each encircling a respective end of said coaxial pipe adjacent each end of said cylindrical member to permit the ends of said pipe to be connected to be inserted into said recess in a manner to encircle said coaxial pipe and to facilitate joining of the pipe to be connected to said cylindrical member; and
adhesive means securing said pipe to be connected to said cylindrical member.

2. The pipe coupling device of claim 1 wherein:
said cylindrical member is formed of polyvinyl chloride.

3. The pipe coupling device of claim 1 wherein:
the respective ends of said coaxial pipe are bevelled to facilitate insertion thereof into the ends of pipe sections to be joined by said pipe coupling device.

4. The pipe coupling device of claim 1 further comprising:
at least one sleeve dimensioned to encircle the end of a pipe to be coupled and to fit within said recesses of said pipe coupling device.

5. The pipe coupling device of claim 4 wherein:
said sleeve is formed of a material which is readily securable to said cylindrical member.

6. The pipe coupling device of claim 4 wherein:
said sleeve is formed of plastic.

7. The pipe coupling device of claim 4 wherein:
said sleeve is formed of polyvinyl chloride.

8. The pipe coupling of claim 1 wherein:
said pipe to be connected is multi-layer pipe having a plastic outer layer.

9. The pipe coupling of claim 8 wherein:
said outer layer is formed of polyvinyl chloride.

10. The pipe coupling of claim 8 further comprising:
said pipe to be connected is formed of copper, and at least one sleeve is provided dimensioned to encircle an end of said pipe to be coupled and to fit within said recesses of said pipe coupling device.

11. The pipe coupling of claim 10 wherein:

said sleeve is formed of a material which is readily securable to said cylindrical member.

12. The pipe coupling device of claim 10 wherein:

said sleeve is formed of plastic.

13. The pipe coupling device of claim 10 wherein:

said sleeve is formed of polyvinyl chloride.

14. The pipe coupling of claim 1 wherein:

a pair of said sleeves are provided, each mounted on the end of a respective one of said pipe sections to be connected.

15. The pipe coupling of claim 1 further comprising:

and annular washer positioned within each of said recesses.

16. The pipe coupling of claim 1 further comprising:

the opposite ends of said cylindrical member being externally threaded, cup shaped nuts threadedly mating with the threads of said cylindrical member and each formed with a central opening, the inner surfaces of said recesses being tapered inwardly toward said central boss, a pair of sleeves each located within a respective one of said recesses and each formed with a cylindrical inner surface and on outer surface tapered to mate with said inner surfaces of said recesses, and annular washers located between said sleeves and said central boss.

17. The pipe coupling of claim 1 wherein:

said pipe is formed with a central recess to aid in positioning pipes to be connected by said pipe coupling.

* * * * *